(12) United States Patent
Lin et al.

(10) Patent No.: US 11,796,728 B1
(45) Date of Patent: Oct. 24, 2023

(54) LIGHT SOURCE MODULE

(71) Applicant: Industrial Technology Research Institute, Hsinchu (TW)

(72) Inventors: Chun-Ting Lin, Taipei (TW); Han-Sung Chan, New Taipei (TW); Chia-Ping Lin, Taipei (TW); Yi-Hsiang Huang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/858,085

(22) Filed: Jul. 6, 2022

(30) Foreign Application Priority Data

Mar. 23, 2022 (TW) .................................. 111110826

(51) Int. Cl.
    *F21V 8/00* (2006.01)
(52) U.S. Cl.
    CPC ........... *G02B 6/0016* (2013.01); *G02B 6/004* (2013.01); *G02B 6/0031* (2013.01)
(58) Field of Classification Search
    CPC ...... G02B 6/0016; G02B 6/0018; G02B 6/02; G02B 6/004
    See application file for complete search history.

(56) References Cited

U.S. PATENT DOCUMENTS

| | | | |
|---|---|---|---|
| 8,564,740 B2 | 10/2013 | Schultz et al. | |
| 10,234,618 B2 | 3/2019 | Choi et al. | |
| 2012/0069575 A1* | 3/2012 | Koh ..................... | G02B 6/0046 362/257 |
| 2019/0346612 A1* | 11/2019 | Herlin .................. | G02B 6/0068 |

FOREIGN PATENT DOCUMENTS

| | | | | |
|---|---|---|---|---|
| CN | 111564116 | | 8/2020 | |
| JP | 2004335401 A | * | 11/2004 | ........... G02B 6/0038 |
| JP | 2008130459 A | * | 6/2008 | |
| JP | 2010114045 | * | 5/2010 | |
| JP | 2016178046 A | * | 10/2016 | |
| KR | 20080083017 A | * | 9/2008 | |
| KR | 20130085132 | | 7/2013 | |
| TW | I242655 | | 11/2005 | |
| TW | I344047 | | 6/2011 | |
| TW | 202045859 | | 12/2020 | |

OTHER PUBLICATIONS

"Office Action of Taiwan Counterpart Application", dated Dec. 30, 2022, p.1-p.3.

* cited by examiner

*Primary Examiner* — Fatima N Farokhrooz
(74) *Attorney, Agent, or Firm* — JCIPRNET

(57) ABSTRACT

A light source module including a light guide plate and a light emitting element is provided. The light guide plate includes an upper surface concentric circle structure and a lower surface concentric circle structure opposite to the upper surface concentric circle structure. The center of the upper surface concentric circle structure corresponds to the center of the lower surface concentric circle structure. The light emitting element is disposed corresponding to the center of the upper surface concentric circle structure and the center of the lower surface concentric circle structure.

12 Claims, 13 Drawing Sheets

LIGHT SOURCE MODULE

CROSS-REFERENCE TO RELATED APPLICATION

This application claims the priority benefit of Taiwan application serial no. 111110826, filed on Mar. 23, 2022. The entirety of the above-mentioned patent application is hereby incorporated by reference herein and made a part of this specification.

BACKGROUND

Technical Field

The disclosure relates to a light source module.

Description of Related Art

A floating imaging device is mainly composed of a light source module, a light shielding layer, and a lens array layer. The light source module is configured to provide a light beam. The light shielding layer is configured to control the area that allows the light beam to pass through. The lens array layer is configured to control the position where the light beam is focused. An observer stands in front of the position where the light beam from the floating imaging device may pass through. When the observer's eyes receive the light beams of different focal points, the outline of a floating object may be drawn by the imaginary lines connecting the different focal points, thereby achieving the effect of imaging the floating object.

In the floating imaging device, the light shielding layer and the lens array layer need to be precisely aligned so that the focused position of the light beam could be precisely controlled. The introduction of a collimated light source module may relax the alignment tolerance between the light shielding layer and the lens array layer, and further help to improve the problem of large-angle stray light.

SUMMARY

In the embodiments of the disclosure, the light source module may include a light guide plate and a light emitting element. The light guide plate includes an upper surface concentric circle structure and a lower surface concentric circle structure opposite to the upper surface concentric circle structure. The center of the upper surface concentric circle structure corresponds to the center of the lower surface concentric circle structure. The light emitting element is disposed corresponding to the center of the upper surface concentric circle structure and the center of the lower surface concentric circle structure.

In order to make the aforementioned features of the disclosure comprehensible, embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
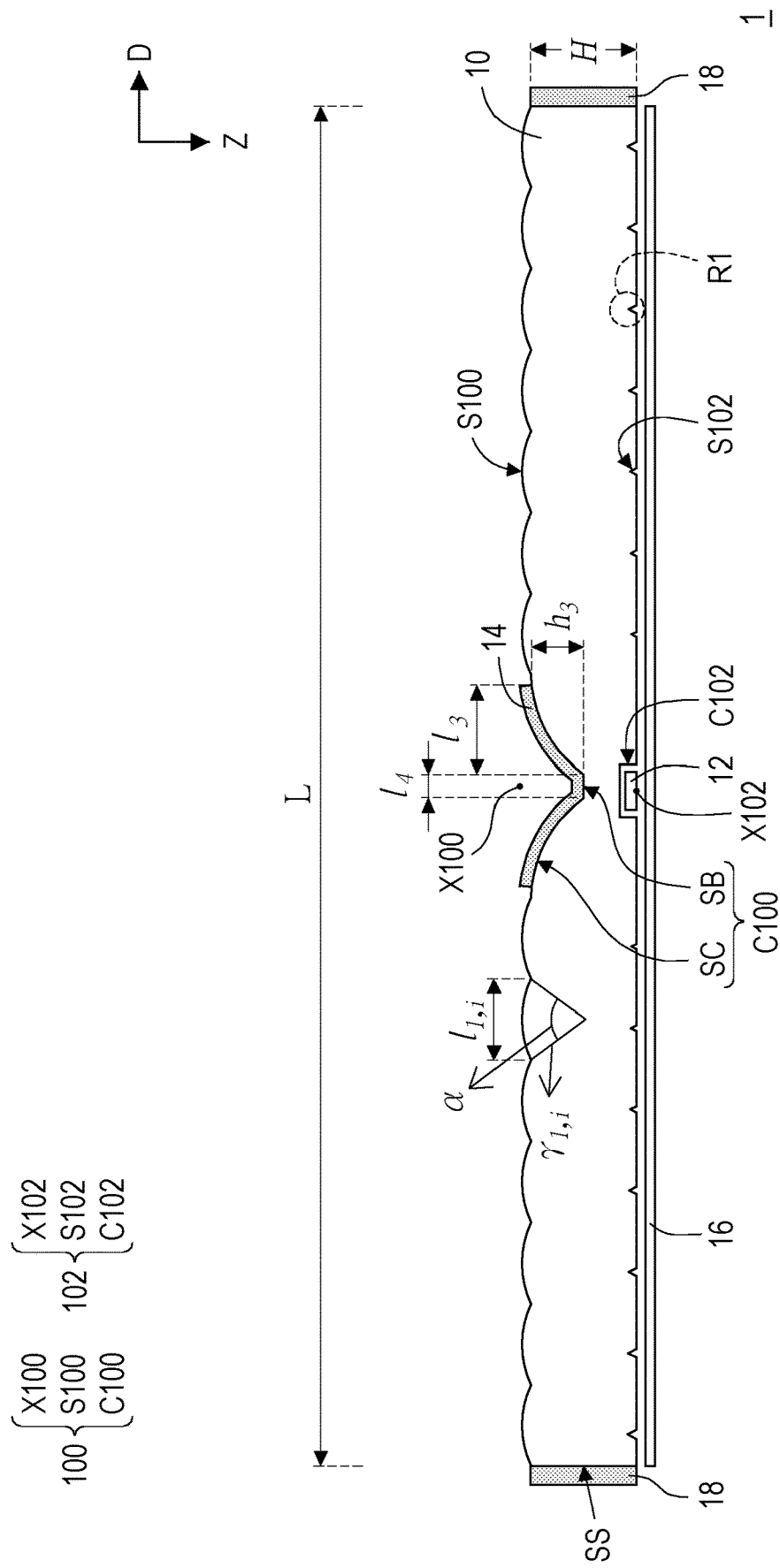
FIG. 1 is a schematic cross-sectional view of a light source module according to a first embodiment of the disclosure.

In the following embodiments, wordings used to indicate directions, such as "up," "down," "front," "back," "left," and "right," merely refer to directions in the accompanying drawings. Therefore, the directional wordings are used to illustrate rather than limit the disclosure.

In the accompanying drawings, the drawings illustrate the general features of the methods, structures, and/or materials used in the particular exemplary embodiments. However, the drawings shall not be interpreted as defining or limiting the scope or nature covered by the exemplary embodiments. For example, the relative size, thickness, and location of film layers, regions, and/or structures may be reduced or enlarged for clarity.

In the embodiments, the same or similar elements will be designated by the same or similar reference numerals, and descriptions thereof will be omitted. In addition, the features of different exemplary embodiments may be combined with each other when they are not in conflict, and simple equivalent changes and modifications made according to the specification or the claims are still within the scope of the disclosure.

The terms such as "first" and "second" mentioned in the specification or the claims are only used to name different elements or to distinguish different embodiments or scopes and are not intended to limit the upper or lower limit of the number of the elements, nor are they intended to limit the manufacturing order or disposition order of the elements. Furthermore, the disposition of an element/film layer on (or over) another element/film layer may include the situation where additional elements/film layers exist or do not exist between the two elements/film layers. In other words, the element/film layer may be disposed directly or indirectly on (or over) the other element/film layer. Moreover, the situation where the element/film layer is directly disposed on (or over) the other element/film layer represents that the two elements/film layers are in contact with each other, and no additional elements/film layers exist between the two elements/film layers.

Figure 2:
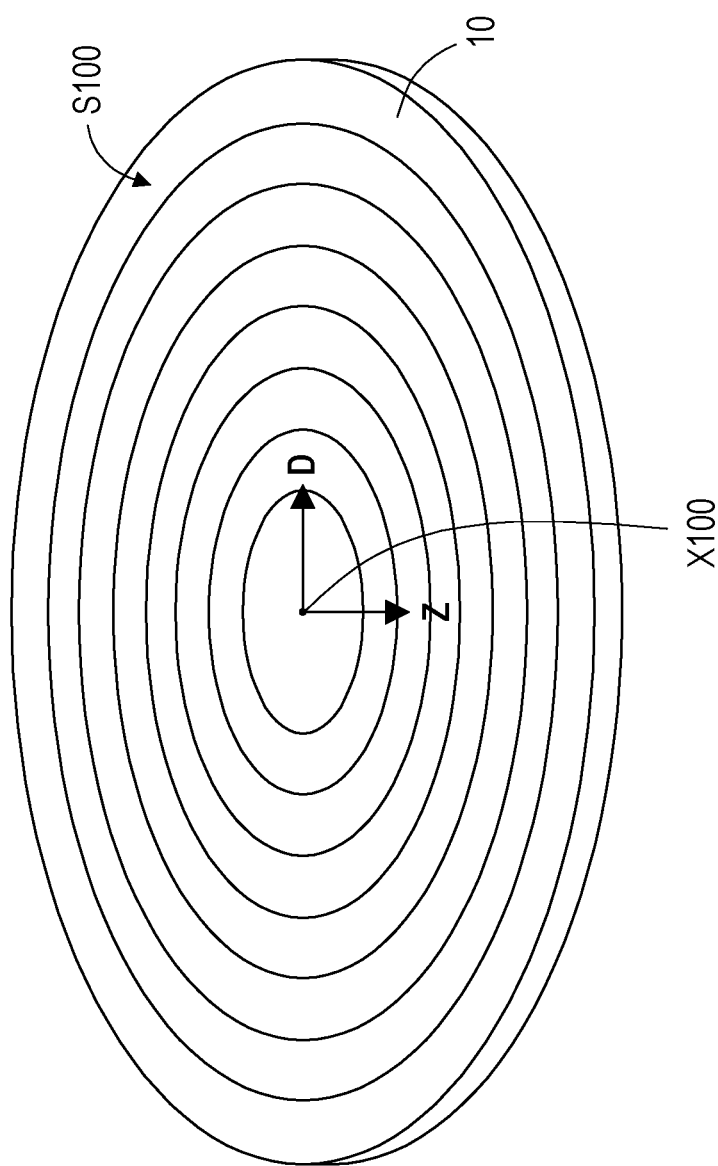
FIG. 2 is a schematic diagram of the light guide plate in FIG. 1.
Figure 3:
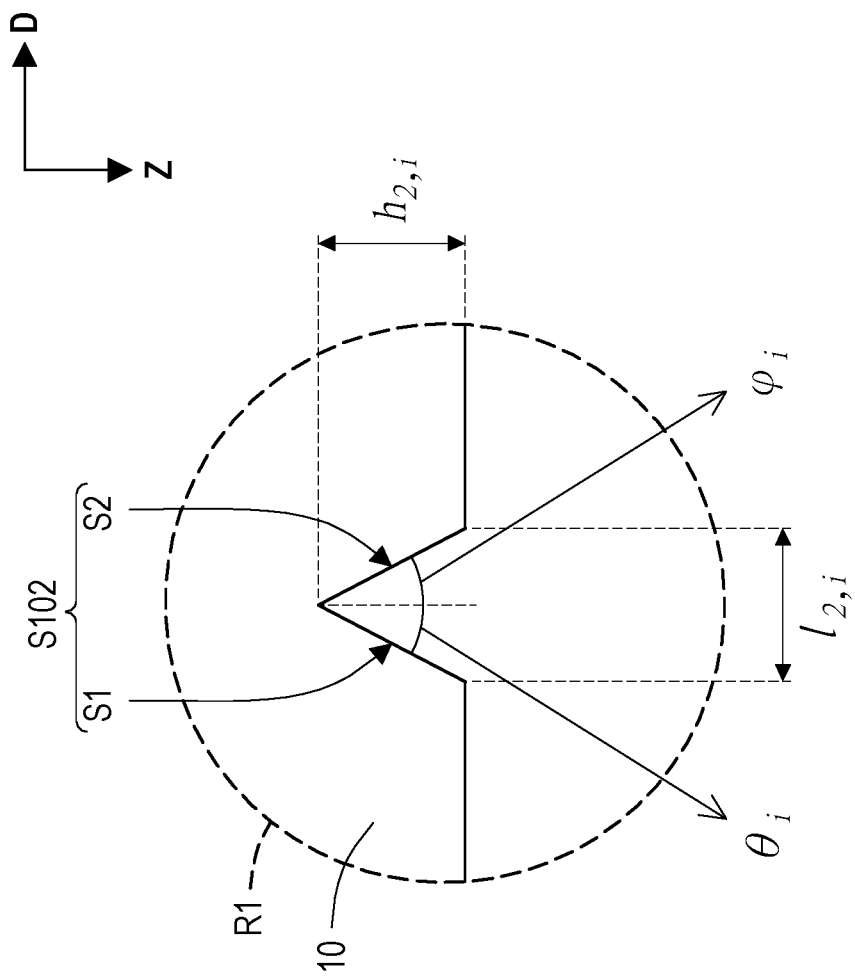
FIG. 3 is an enlarged schematic view of the region R1 in FIG. 1.
Figure 4:
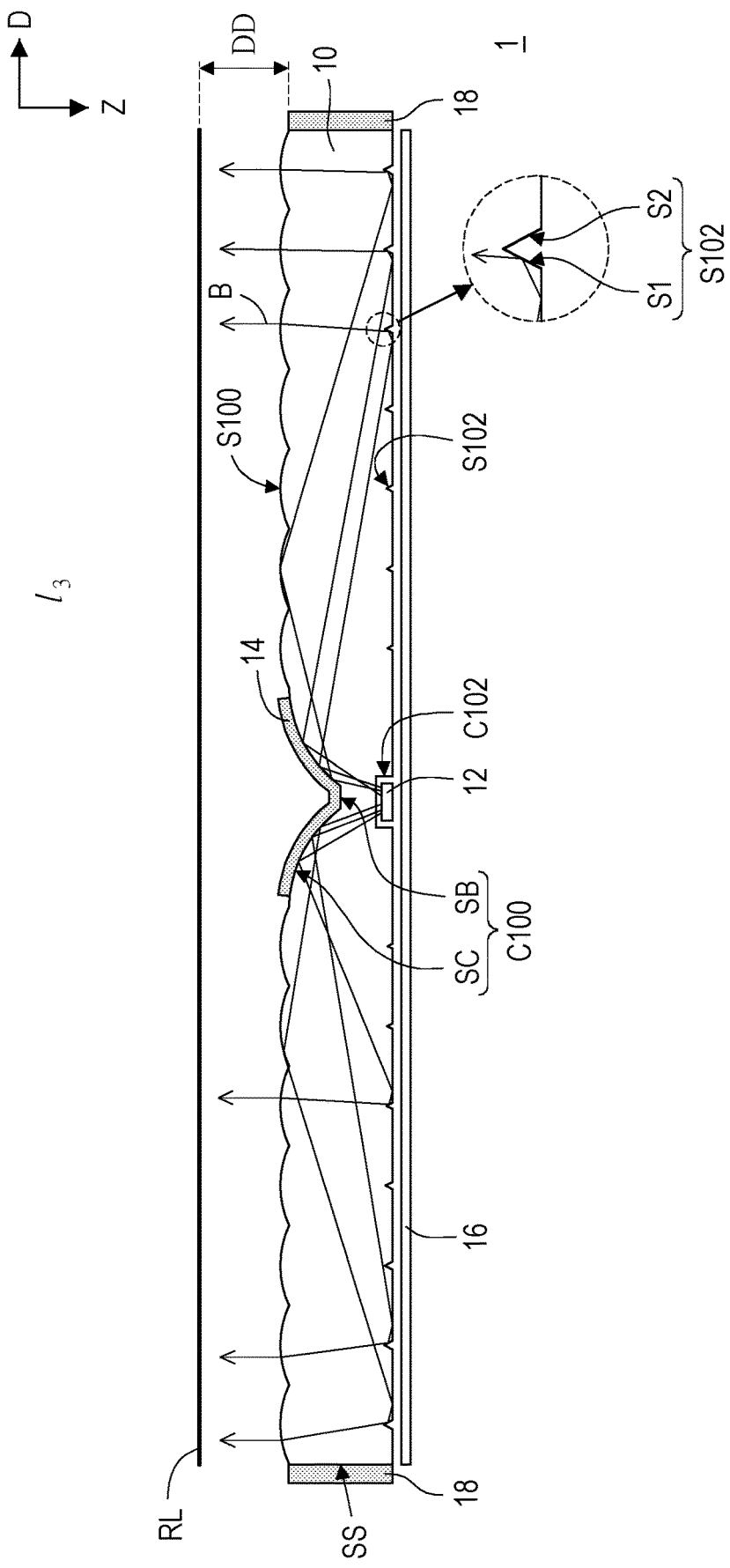
FIG. 4 is a schematic diagram of light beam transmission of the light source module of FIG. 1.
Figure 5:
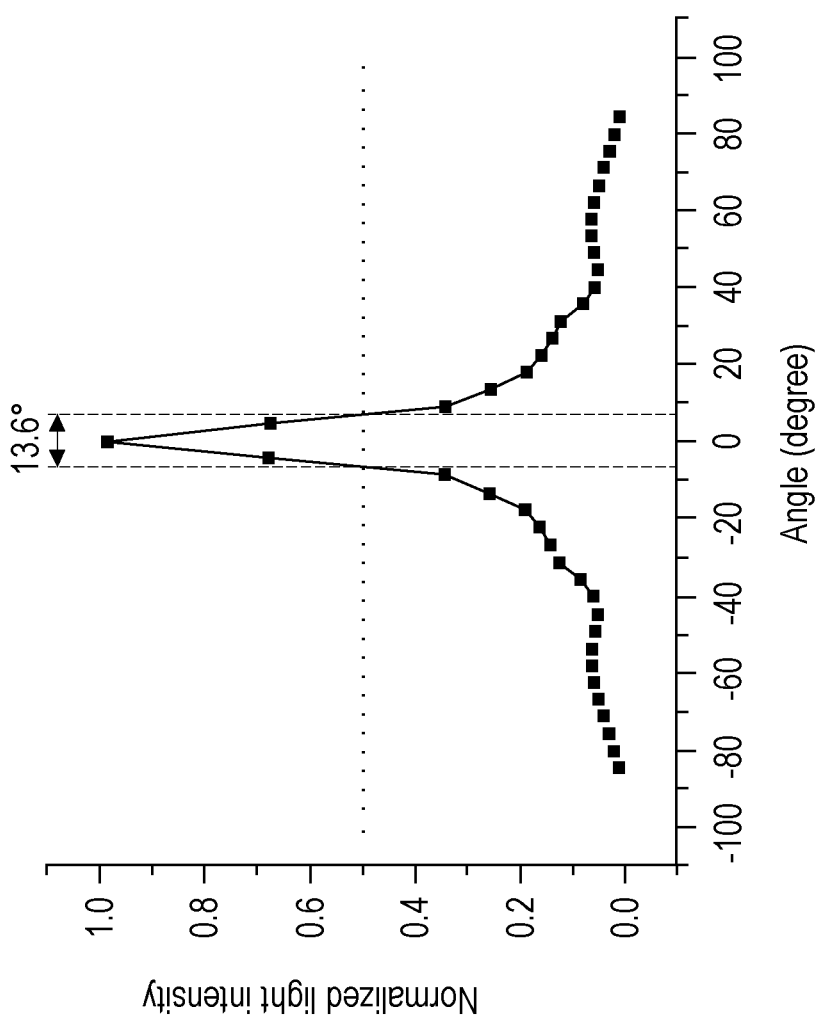
FIG. 5 is a light beam angle distribution diagram of the light source module of FIG. 1.
Figure 6:
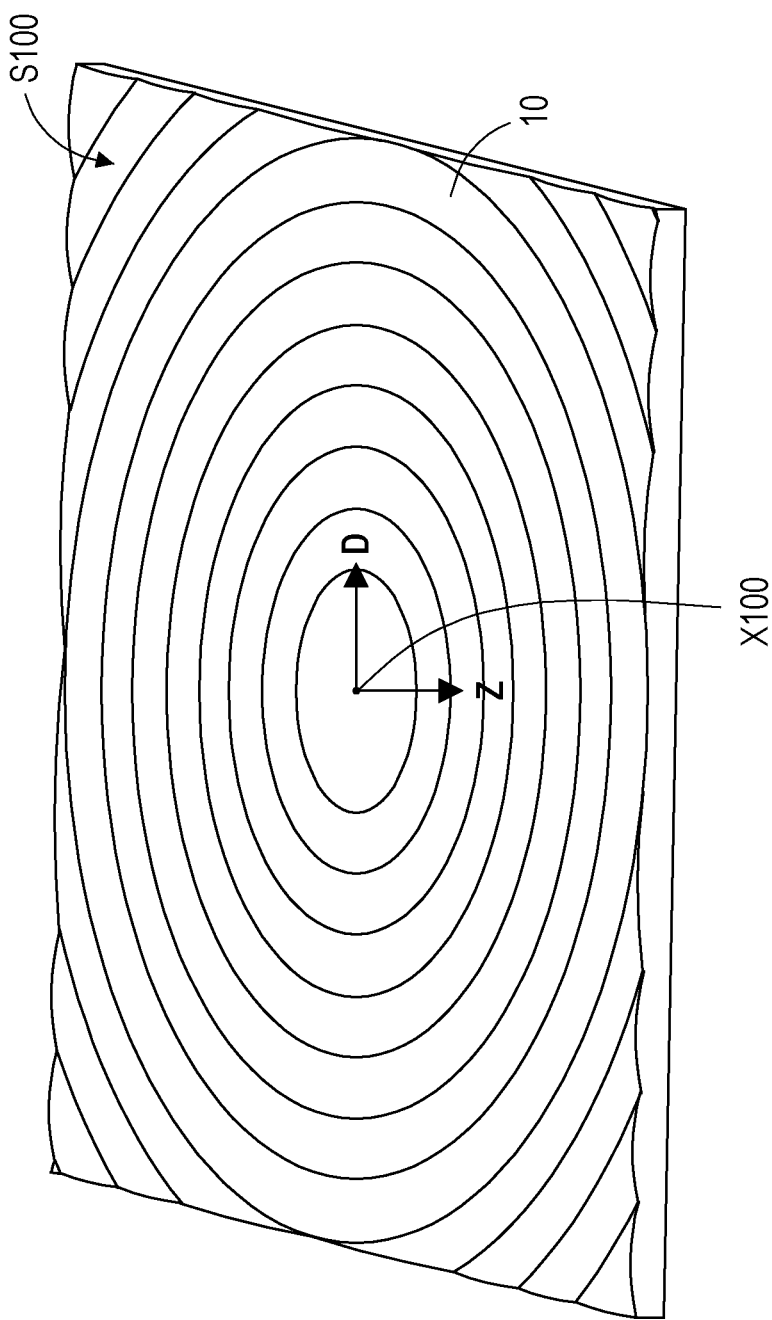
FIG. 6 and FIG. 7 are schematic diagrams of other implementations of the light guide plate of FIG. 1, respectively.
Figure 7:
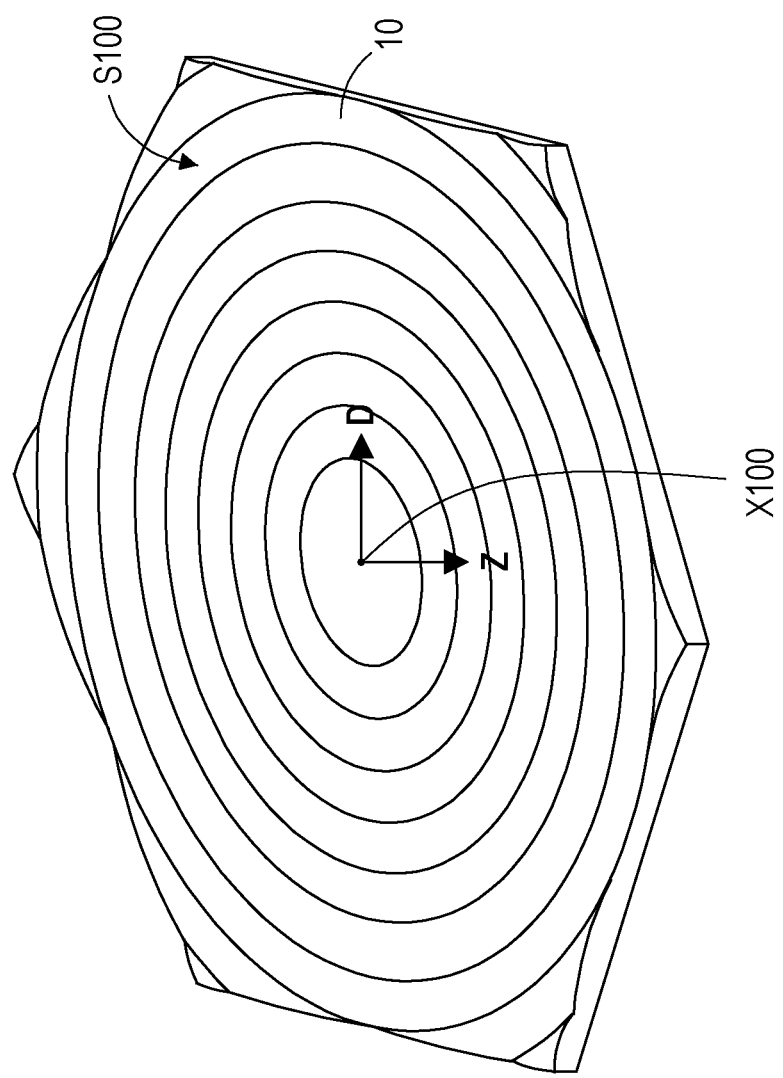

FIG. 1 is a schematic cross-sectional view of a light source module according to a first embodiment of the disclosure. FIG. 2 is a schematic diagram of the light guide plate in FIG. 1. FIG. 3 is an enlarged schematic view of the region R1 in FIG. 1. FIG. 4 is a schematic diagram of light beam transmission of the light source module of FIG. 1. FIG. 5 is a light beam angle distribution diagram of the light source module of FIG. 1. FIG. 6 and FIG. 7 are schematic diagrams of other implementations of the light guide plate of FIG. 1, respectively.

Referring to FIGS. 1 and 2, a light source module 1 may include a light guide plate 10 and a light emitting element 12. The light guide plate 10 includes an upper surface concentric circle structure 100 and a lower surface concentric circle structure 102 opposite to the upper surface concentric circle structure 100. A center X100 of the upper surface concentric circle structure 100 corresponds to a center X102 of the lower surface concentric circle structure 102. The light emitting element 12 is disposed corresponding to the center X100 of the upper surface concentric circle structure 100 and the center X102 of the lower surface concentric circle structure 102.

In the description, the disposition of one element/point corresponding to another element/point generally refers to the situation where two elements/two points are designed to overlap in the top view direction Z of the light source module 1 or two elements/two points are adjacently disposed in the top view direction Z of the light source module 1. Considering process error, alignment error or other actual conditions, the overlapping of two elements/two points in the top view direction Z of the light source module 1 is also intended to be extended to the situation where two elements/two points have some misalignments or offsets in the top view direction Z of the light source module 1. For example, the above-mentioned "the center X100 corresponds to the center X102" may include the situation where the center X100 and the center X102 overlap or substantially overlap in the top view direction Z, and the above-mentioned "the light emitting element 12 is disposed corresponding to the center X100 and the center X102" may include the situation where the light emitting element 12, the center X100, and the center X102 overlap or substantially overlap in the top view direction Z, and the light emitting element 12 is disposed adjacent to the center X100 and the center X102 in the top view direction Z.

The upper surface concentric circle structure 100 and the lower surface concentric circle structure 102 may be designed to allow the light beam transmitted in the light guide plate 10 to be uniformly emitted from the upper surface of the light guide plate 10 with a small divergence angle. For example, as shown in FIG. 2, the upper surface concentric circle structure 100 may include multiple lens microstructures S100 arranged in concentric circles and a recess C100 disposed corresponding to the center X100, but is not limited thereto. Moreover, the lower surface concentric circle structure 102 may include multiple V-groove microstructures S102 arranged in concentric circles and a groove C102 disposed corresponding to the center X102, but is not limited thereto.

The lens microstructures S100 are, for example, connected to each other and arranged in a direction away from the center X100 (e.g., the direction D). The recess C100 is disposed corresponding to the light emitting element 12 and may include a bottom surface SB and an arc surface SC. The arc surface SC is connected to the bottom surface SB and the lens microstructure S100 closest to the center X100. In some embodiments, the light source module 1 may further include a first reflective layer 14, and the first reflective layer 14 is disposed on the recess C100 to reflect the light beam directed toward the recess C100. The material of the first reflective layer 14 may include metal, alloy or other reflective materials.

The V-groove microstructures S102 are, for example, separated from each other and arranged in the direction away from the center X100 (e.g., the direction D). The V-groove microstructure S102 has a first inclined surface S1 and a second inclined surface S2, and the first inclined surface S1 is located between the center X102 and the second inclined surface S2. The lens microstructures S100 and the V-groove microstructures S102 are, for example, disposed in a one-to-one relationship, and each of the V-groove microstructures S102 is disposed adjacent to the focal point (not shown) of the corresponding lens microstructure S100. For example, each of the V-groove microstructures S102 may be disposed at or near the focal point of the corresponding lens microstructure S100, for example, the focal point of the lens microstructure S100 falls within the width range of the V-groove microstructure S102 (see the width $l_{2,i}$ in FIG. 3). The groove C102 is surrounded by the V-groove microstructures S102, and the light emitting element 12 is disposed in the groove C102.

Referring to FIG. 4, a light beam B emitted by the light emitting element 12 is transmitted upward to the recess C100 and is reflected by the first reflective layer 14 disposed on the recess C100 to be transmitted in the light guide plate 10. The light beam B transmitted in the light guide plate 10 is reflected by the V-groove microstructures S102 to the lens microstructures S100 located above the V-groove microstructures S102, and is refracted by the lens microstructures S100 to be emitted from the light guide plate 10. The V-groove microstructures S102 are configured to destroy the total internal reflection (TIR) of light, so that the light beam B is transmitted upward to the corresponding lens microstructures S100 and exits from the light guide plate 10. The lens microstructures S100 are configured to collimate the light beam, so that the light beam may be emitted from the light guide plate 10 with a smaller divergence angle.

In some embodiments, as shown in FIGS. 1 and 2, the light guide plate 10 may be a thin plate made of an acrylic material (refractive index is 1.49) to reduce the thickness of the module. For example, the shape of the light guide plate 10 may be a circle, and a diameter L of the light guide plate 10 is 50 mm, and a thickness H is 3 mm. However, the material, shape, or size (such as the length, width, or thickness) of the light guide plate 10 may be changed according to actual needs, and are not limited thereto. For example, in other embodiments, the light guide plate 10 may be a thin plate made of other materials. In addition, the shape of the light guide plate 10 may be quadrilateral (as shown in FIG. 6), hexagonal (as shown in FIG. 7), or other polygonal or irregular shapes.

In some embodiments, the arc surface of each of the lens microstructures S100 may be designed to be relatively flat. For example, the arc opening angle α of each of the lens microstructures S100 may be greater than or equal to 1 degree and less than or equal to 30 degrees, so as to reduce the probability that the light beam B is directly refracted out of the light guide plate 10 from the lens microstructures S100 without the action of the V-groove microstructures S102 (e.g., reflection). In this way, more light beams B may be transmitted to the V-groove microstructures S102 away from the light emitting element 12 through total internal reflection, and then exit the light guide plate 10 from the corresponding lens microstructures S100. With this design, the divergence angle of the light beam B emitted from the light guide plate 10 could be well controlled, and more light beams B could be emitted from the light guide plate 10 from the area away from the light emitting element 12, thereby improving the directivity (or collimation) and/or uniformity of the light emitted by the light source module 1. For example, the arc opening angle α may be 16 degrees, but is not limited thereto.

As shown in FIGS. 1 and 2, the radius of curvature of the ith lens microstructure S100 is $r_{1,i}$, and the width of the ith lens microstructure S100 is where i is a positive integer from 1 to N, and N is the number of lens microstructures S100 (or V-groove microstructures S102). The lens microstructure S100 closest to the center X100 is the first lens microstructure, and the lens microstructure S100 farthest from the center X100 is the Nth lens microstructure. FIGS. 1 and 2 schematically illustrate seven lens microstructures S100 and seven V-groove microstructures S102, that is, N=7. However, the number of the lens microstructures S100 (or the V-groove microstructures S102) may be changed according to actual needs. For example, N may be 69, but is not limited thereto.

In some embodiments, as shown in FIG. 1, the radii of curvature and the widths of the lens microstructures S100 may not vary with the change of the distance from the center X100, that is, $r_{1,i}$ and $l_{1,i}$ may be fixed values, such as $r_{1,i}$=0.987 mm, and $l_{1,i}$=0.275 mm, but are not limited thereto. In other embodiments, although not shown, $r_{1,i}$ and may vary with the change of distance from the center X100, for example, $r_{1,i}$ and $l_{1,i}$ may gradually increase or gradually decrease with the change of the distance from the center X100, but are not limited thereto.

As shown in FIGS. 1 and 3, the height of the ith V-groove microstructure S102 is $h_{2,i}$, and the width of the ith V-groove microstructure S102 is $l_{2,i}$. The V-groove microstructure S102 closest to the center X102 is the first V-groove microstructure, and the V-groove microstructure S102 farthest from the center X102 is the Nth V-groove microstructure. In some embodiments, the heights and widths of the V-groove microstructures S102 may gradually increase in the direction away from the center X102 (e.g., the direction D) of the lower surface concentric circle structure 102. For example, $h_{2,i}$=0.07*i/N (unit is mm), and $l_{2,i}$=0.068*i/N (unit is mm), but are not limited thereto. Taking i=2 as an example, the height and width of the second V-groove microstructure S102 may be about 0.00203 mm and 0.00197 mm, respectively, but are not limited thereto.

In one embodiment, the radii of curvature $r_{1,i}$ and the widths $l_{1,i}$ of the lens microstructures S100 are fixed, and the heights $h_{2,i}$ and widths $l_{2,i}$ of the V-groove microstructures S102 gradually increase with the increase in the distance between the V-groove microstructures S102 and the center X102. That is, the heights $h_{2,i}$ and widths $l_{2,i}$ of the V-groove microstructures S102 gradually increase in the direction away from the center X102 (e.g., the direction D) of the lower surface concentric circle structure 102. In another embodiment, although not shown, the radii of curvature $r_{1,i}$ and the widths $l_{1,i}$ of the lens microstructures S100 gradually increase with the increase in the distance between the lens microstructures S100 and the center X100. That is, the radii of curvature $r_{1,i}$ and the widths $l_{1,i}$ of the lens microstructures S100 gradually increase in the direction away from the center X100 (e.g. the direction D) of the upper surface concentric circle structure 100, and the heights $h_{2,i}$ and the widths $l_{2,i}$ of the V-groove microstructures S102 also gradually increase with the increase in the distance between the V-groove microstructures S102 and the center X102. In still other embodiments, although not shown, the radii of curvature $r_{1,i}$ and the widths $l_{1,i}$ of the lens microstructures S100 gradually decrease with the increase in the distance between the lens microstructures S100 and the center X100. That is, the radii of curvature $r_{1,i}$ and the widths $l_{1,i}$ of the lens microstructures S100 gradually decrease in the direction away from the center X100 (e.g. the direction D) of the upper surface concentric circle structure 100, and the heights $h_{2,i}$ and the widths $l_{2,i}$ of the V-groove microstructures S102 gradually increase with the increase in the distance between the V-groove microstructures S102 and the center X100.

As shown in FIG. 3, a first angle $θ_i$ is provided between the first inclined surface S1 of the V-groove microstructure S102 and a vertical line (as shown by a dashed line), and a second angle $φ_i$ is provided between the second inclined surface S2 of the V-groove microstructure S102 and the vertical line (as shown by the dashed line). The divergence angle or directivity of the light beam B emitted from the light guide plate 10 may be controlled through the design of the first angle $θ_i$ and the second angle $φ_i$. For example, the first angle $θ_i$ and the second angle $φ_i$ may both be greater than or equal to 10 degrees and less than or equal to 40 degrees, for example, the first angle θ and the second angle $φ_i$ may both be 26 degrees, but are not limited thereto. Depending on the material or thickness H of the light guide plate 10, the first angle $θ_i$ and the second angle $φ_i$ may have different angular ranges. In addition, the first angle $θ_i$ and the second angle $φ_i$ may be the same or different.

In some embodiments, as shown in FIG. 1, a diameter $l_4$ of the bottom surface SB of the recess C100 may be greater than or equal to 0 mm and less than or equal to 2 mm, and a horizontal projection length $l_3$ of the arc surface SC of the recess C100 and a vertical projection height $h_3$ of the arc surface SC may all be greater than or equal to 0.5 mm and less than or equal to 20 mm. In addition, the cross-sectional shape of the arc surface SC may include a Bezier curve. For example, the diameter $l_4$ may be 0.4 mm, the Bezier coefficient of the Bezier curve may be 0.6, the horizontal projection length 13 may be 5.8 mm, and the vertical projection height $h_3$ may be 2 mm, but are not limited thereto.

In some embodiments, the light emitting element 12 may be a light emitting diode chip with a light emitting area of 1 mm*1 mm and a thickness of 0.2 mm, but is not limited thereto. In addition, the groove C102 may be a circular groove or a quadrangular groove, but is not limited thereto.

In some embodiments, as shown in FIG. 4, the light source module 1 may further include a reflective sheet 16 and a second reflective layer 18. The reflective sheet 16 is disposed at the bottom of the light guide plate 10 to reflect the light beam emitted from the bottom of the light guide plate 10 back into the light guide plate 10, thereby increasing the efficiency of light output from the front side of the light guide plate. The second reflective layer 18 is disposed on a side surface SS of the light guide plate 10 to reflect the light beam emitted from the side surface SS of the light guide plate 10 back into the light guide plate 10, thereby increasing the efficiency of light output from the front side of the light guide plate. The reflective sheet 16 may be a white reflective sheet, but is not limited thereto. In some embodiments, although not shown, a reflective layer may be directly formed at the bottom of the light guide plate 10 to omit the reflective sheet 16. The same change may be made in the following embodiments, so the description will not be repeated below. The material of the second reflective layer 18 may include metal, alloy, or other reflective materials.

In some embodiments, as shown in FIG. 4, a light receiving area RL is provided above the light guide plate 10 for receiving the light beam B emitted from the light guide plate 10. The cross-sectional area of the light receiving area RL is the same as the cross-sectional area of the light guide plate 10. In some embodiments, a distance DD between the light receiving area RL and the light guide plate 10 is 2.5 mm, but is not limited thereto.

According to a simulation result, as shown in FIG. 5, the full width at half maximum (FWHM) of the divergence angle of the light beam received in the light receiving area RL (see FIG. 4) is about 13.6 degrees, the light intensity received in the light receiving area RL is about 79.5% of the light intensity emitted by the light emitting element 12 (see FIG. 1), and the illuminance uniformity in the light receiving area RL is about 65.6%. Illuminance uniformity is defined as the minimum illuminance value divided by the average illuminance value.

In the embodiment, the light source module 1 is, for example, a direct type light source module. The light emitting element 12 is disposed below the light guide plate 10, and the light emitting element 12, the center X100, and the center X102 overlap or substantially overlap in the top view direction Z. The light beam B from the light emitting element 12 is guided into the light guide plate 10 by the reflective curved surface (the recess C100 and the first reflective layer 14) above the light emitting element 12. With the design of the lens microstructures S100 and the V-groove microstructures S102, the light beam B transmitted in the light guide plate 10 is enabled to be emitted from the upper surface of the light guide plate 10 with a small divergence angle. The directivity and/or uniformity of light emitted by the light source module 1 may be improved by utilizing the above design, and the light source module 1 may be applied to electronic devices that have special requirements for directivity and/or uniformity of light. For example, the light source module 1 may be used as a backlight module of the floating imaging device, so as to relax the alignment tolerance between the light shielding layer and the lens array layer, and improve the problem of large-angle stray light. Alternatively, the light source module 1 may be used as a backlight module of a privacy protection electronic device, so that the disposition of a privacy protection sheet may be omitted, and the brightness of the privacy protection electronic device may be improved. Furthermore, the light source module 1 may be used as a backlight module for an in-vehicle display with an upward viewing angle, but is not limited thereto. It should also be mentioned that although not shown, the light source module 1 may include multiple light guide plates 10 and multiple light emitting elements 12, the number of the light guide plates 10 and the number of the light emitting elements 12 are the same, and the relative disposition relationship of the light guide plates 10 and the light emitting elements 12 may be referred to the above, and the description is not repeated here. The light guide plates 10 may be spliced together to form a light source module of larger size. Since the light guide plate 10 helps to improve the uniformity of the light emitted by the light source module 1, the distance between the light emitting elements 12 may be increased under the structure provided with the light guide plate 10, so as to reduce the required number of light emitting elements 12 in an electronic device of the same size, thereby reducing the process cost.

Figure 8:
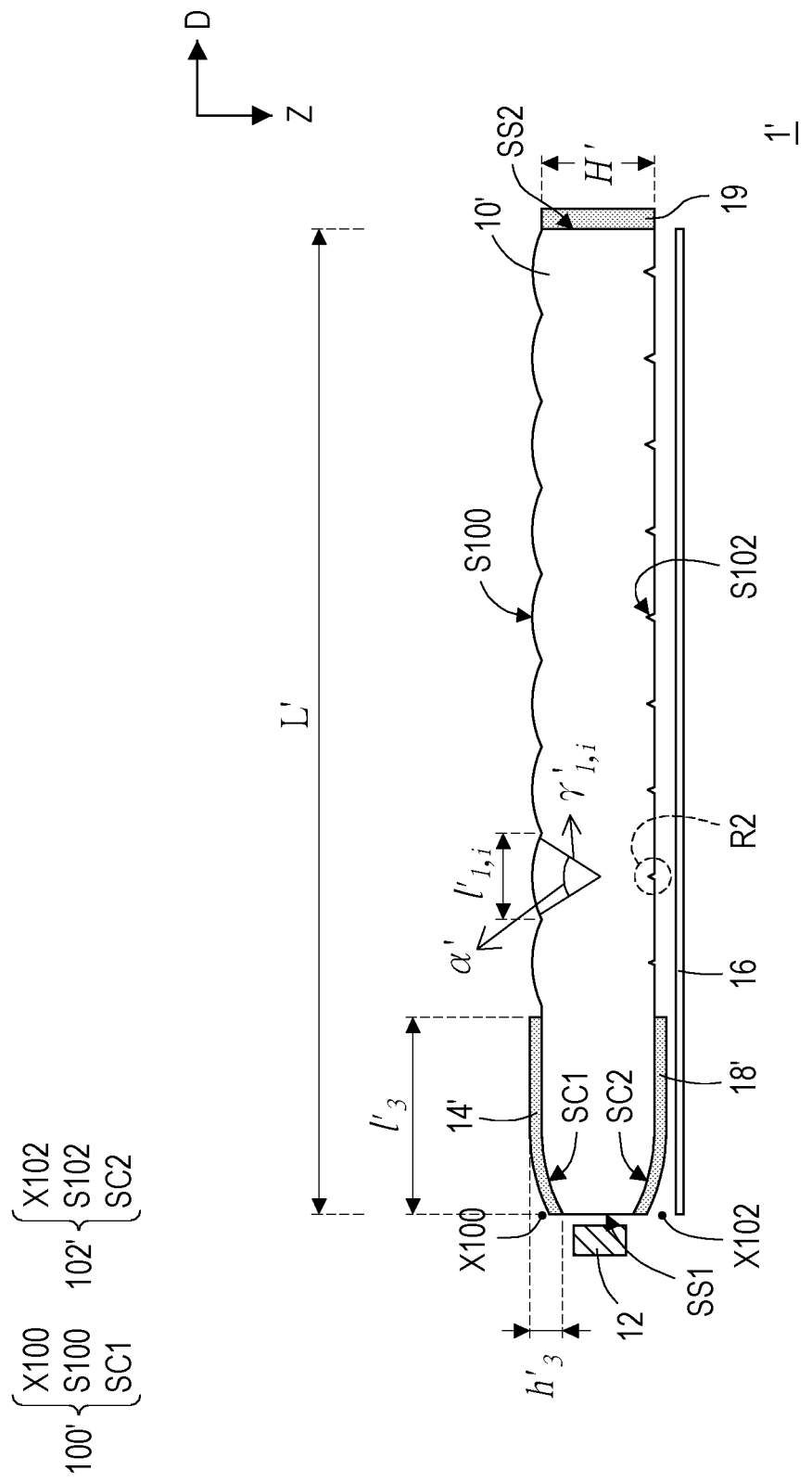
FIG. 8 is a schematic cross-sectional view of a light source module according to a second embodiment of the disclosure.
Figure 9:
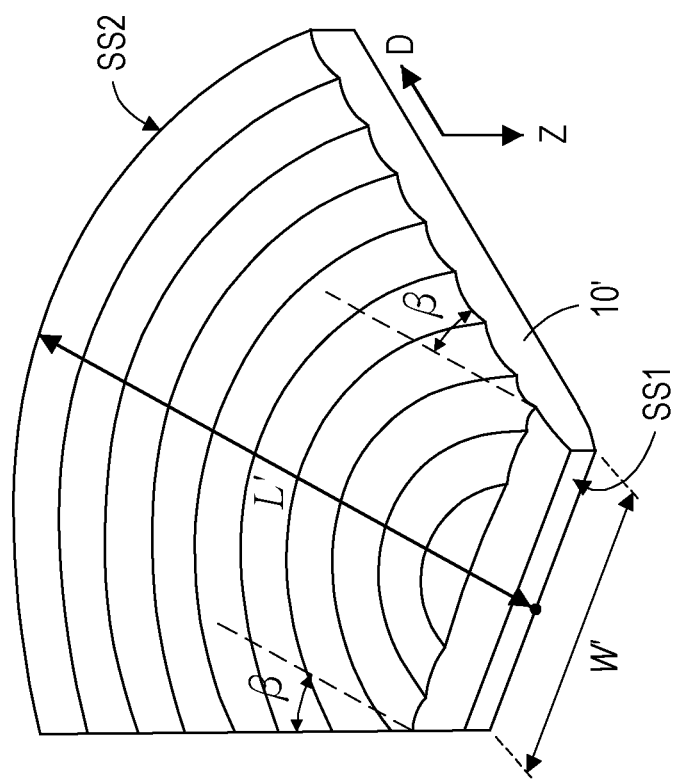
FIG. 9 is a schematic diagram of the light guide plate in FIG. 8.
Figure 10:
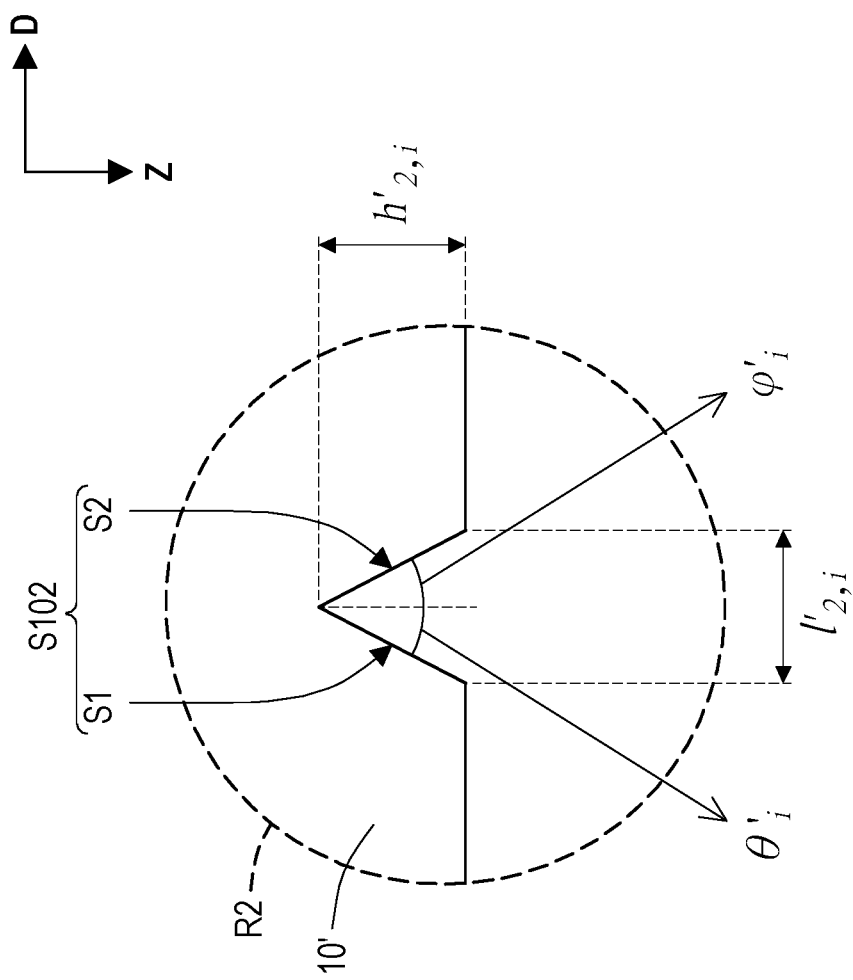
FIG. 10 is an enlarged schematic view of the region R2 in FIG. 8.
Figure 11:
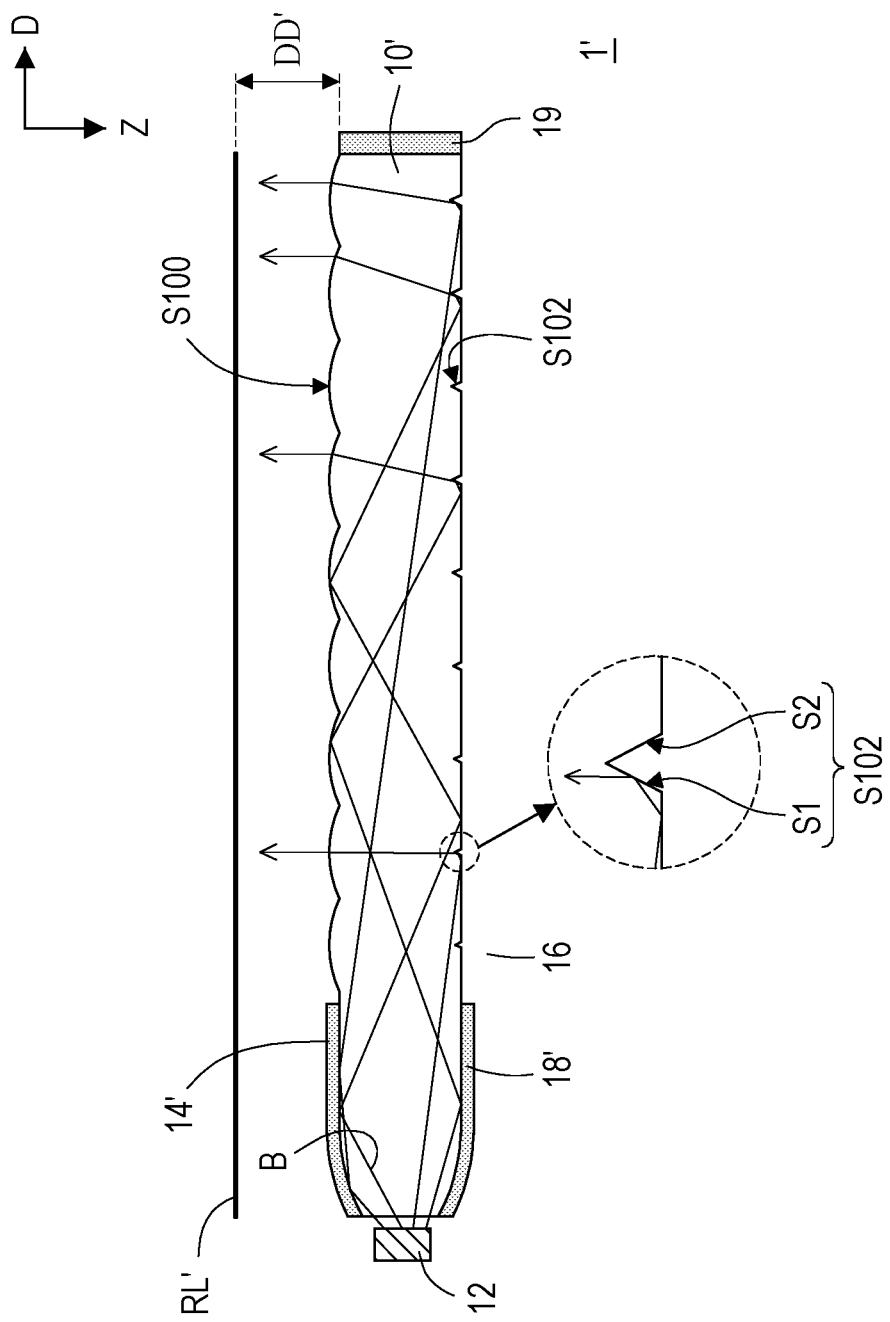
FIG. 11 is a schematic diagram of light beam transmission of the light source module of FIG. 8.
Figure 12:
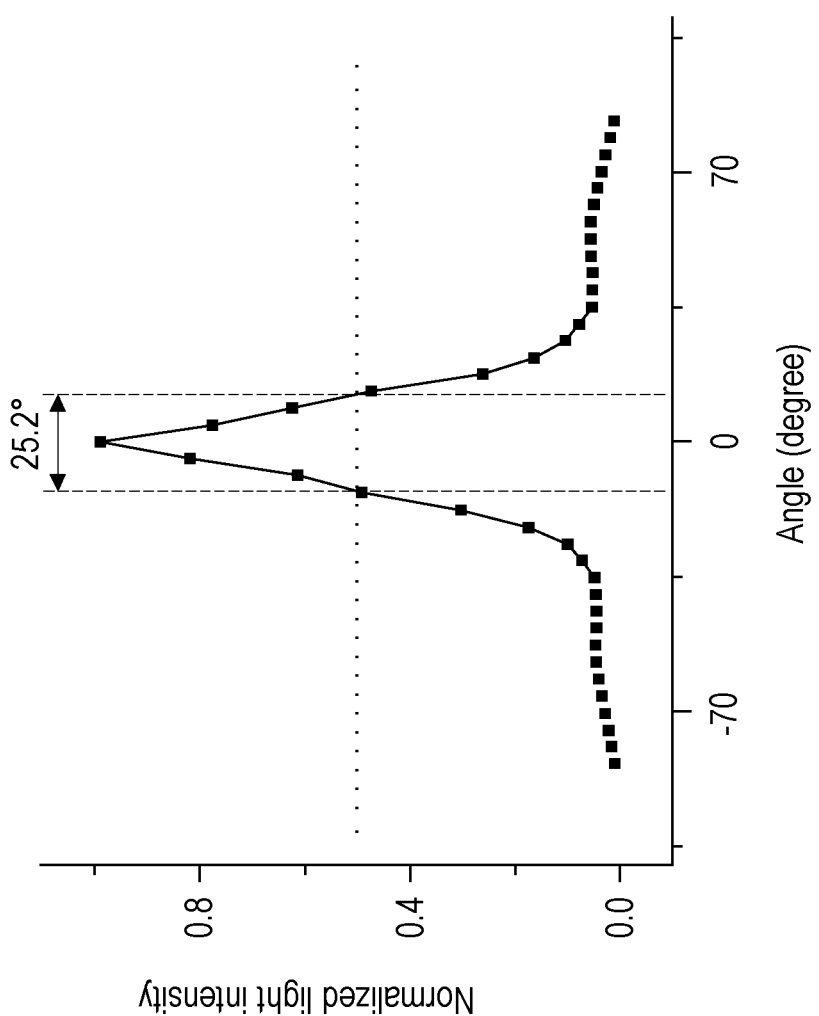
FIG. 12 is a light beam angle distribution diagram of the light source module of FIG. 8.
Figure 13:
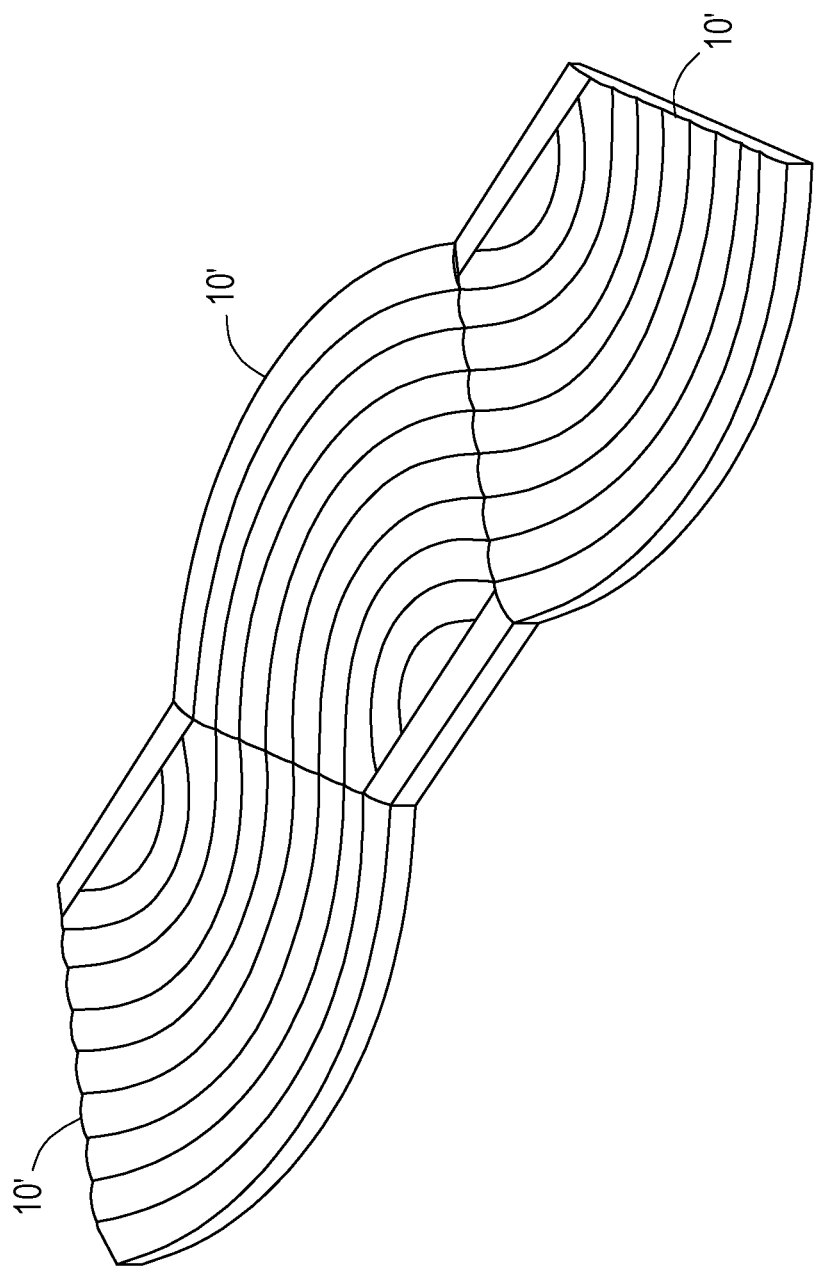
FIG. 13 is another schematic diagram of the light guide plate in FIG. 8.

FIG. 8 is a schematic cross-sectional view of a light source module according to a second embodiment of the disclosure. FIG. 9 is a schematic diagram of the light guide plate in FIG. 8. FIG. 10 is an enlarged schematic view of the region R2 in FIG. 8. FIG. 11 is a schematic diagram of light beam transmission of the light source module of FIG. 8. FIG. 12 is a light beam angle distribution diagram of the light source module of FIG. 8. FIG. 13 is another schematic diagram of the light guide plate in FIG. 8.

Referring to FIGS. 8 and 9, a light source module 1' is, for example, an edge type light source module. The light source module 1' may include a light guide plate 10', the light emitting element 12, the reflective sheet 16, a first reflective layer 14', a second reflective layer 18', and a third reflective layer 19, but is not limited thereto. According to different requirements, the light source module 1' may add or subtract one or more elements or film layers.

The light guide plate 10' may include an upper surface concentric circle structure 100', a lower surface concentric circle structure 102', a first side surface SS1, and a second side surface SS2 opposite to the first side surface SS1. The center X100 of the upper surface concentric circle structure 100' and the center X102 of the lower surface concentric circle structure 102' are located on the first side surface SS1, and the light emitting element 12 faces the first side surface SS1. The third reflective layer 19 is disposed, for example, on the second side surface SS2. The material of the third reflective layer 19 may include metal, alloy, or other reflective materials.

In addition to the center X100 and the lens microstructures S100, the upper surface concentric circle structure 100' may further include a first arc surface SC1. The first arc surface SC1 is connected to the first side surface SS1 and the lens microstructure S100 closest to the center X100. The first reflective layer 14' is, for example, disposed on the first arc surface SC1. The material of the first reflective layer 14' may include metal, alloy or other reflective materials.

In addition to the center X102 and the V-groove microstructures S102, the lower surface concentric circle structure 102' may further include a second arc surface SC2, and the second arc surface SC2 is connected to the first side surface SS1 and the V-groove microstructure S102 closest to the center X100. The second reflective layer 18' is, for example, disposed on the second arc surface SC2. The material of the second reflective layer 18' may include metal, alloy, or other reflective materials.

In some embodiments, as shown in FIGS. 8 and 9, the light guide plate 10' may be a thin plate made of an acrylic material (refractive index is 1.49) to reduce the thickness of the module. For example, the top view shape of the light guide plate 10' may be a fan shape, the first side surface SS1 is a vertical surface, and the second side surface SS2 is a curved surface. In some embodiments, a width W' of the first side surface SS1 is 2 mm, a central cross-sectional length L' of the light guide plate 10' is 50 mm, a thickness H' of the light guide plate 10' is 3 mm, and a half-sector angle β is 30 degrees. However, the material, shape, or size (such as the length, width, thickness, or half-sector angle) of the light guide plate 10' may be changed according to actual needs, and are not limited thereto. For example, in other embodiments, the light guide plate 10' may be a thin plate made of other materials. In addition, the light source module 1' may include multiple light guide plates 10', and the light guide plates 10' may be spliced together (please refer to FIG. 13) to form a light source module of larger size.

In some embodiments, the arc surface of each of the lens microstructures S100 may be designed to be relatively flat. For example, the arc opening angle α' of each of the lens microstructures S100 may be greater than or equal to 1 degree and less than or equal to 30 degrees, so as to reduce the probability that the light beam is directly refracted out of the light guide plate 10 from the lens microstructures S100 without the action of the V-groove microstructures S102 (e.g., reflection). For example, the arc opening angle α' may be 16 degrees, but is not limited thereto.

As shown in FIGS. 8 and 9, the radius of curvature of the ith lens microstructure S100 is $r'_{1,i}$, and the width of the ith lens microstructure S100 is $l'_{1,i}$, where i is a positive integer from 1 to N', and N' is the number of lens microstructures S100 (or V-groove microstructures S102). FIGS. 8 and 9 schematically illustrate nine lens microstructures S100 and nine V-groove microstructures S102, that is, N'=9. However, the number of the lens microstructures S100 (or the V-groove microstructures S102) may be changed according to actual needs. For example, N' may be 145, but is not limited thereto.

In some embodiments, as shown in FIG. 8, the radii of curvature and the widths of the lens microstructures S100 may not vary with the change of the distance from the center X100, that is, $r'_{1,i}$ and may be fixed values, such as $r'_{1,i}$=0.987 mm, and $l'_{1,i}$=0.275 mm, but are not limited thereto. In other embodiments, although not shown, $r'_{1,i}$ and $l'_{1,i}$ may vary with the change of distance from the center X100, for example, $r'_{1,i}$ and $l'_{1,i}$ may gradually increase or gradually decrease with the change of the distance from the center X100, but are not limited thereto.

As shown in FIGS. 8 and 10, the height of the ith V-groove microstructure S102 is $h'_{2,i}$, and the width of the ith V-groove microstructure S102 is $l'_{2,i}$. In some embodiments, the heights and widths of the V-groove microstructures S102 may gradually increase in the direction away from the center X102 (e.g., the direction D) of the lower surface concentric circle structure 102. For example, $h'_{2,i}$=0.07*i/N' (unit is mm), and $l'_{2,i}$=0.096*i/N' (unit is mm), but are not limited thereto.

As shown in FIG. 10, a first angle $θ'_i$ is provided between the first inclined surface S1 of the V-groove microstructure S102 and the vertical line (as shown by the dashed line), and a second angle $φ'_i$ is provided between the second inclined surface S2 of the V-groove microstructure S102 and the vertical line (as shown by the dashed line). The divergence angle or directivity of the light beam B (refer to FIG. 11) emitted from the light guide plate 10' may be controlled through the design of the first angle $θ'_i$ and the second angle $φ'_i$. For example, the first angle $θ'_i$ and the second angle $φ'_i$ may both be greater than or equal to 10 degrees and less than or equal to 40 degrees, for example, the first angle $θ'_i$ and the second angle $φ'_i$ may both be 34.5 degrees, but are not limited thereto. Depending on the material or thickness H' of the light guide plate 10', the first angle $θ'_i$ and the second angle $φ'_i$ may have different angular ranges. In addition, the first angle $θ'_i$ and the second angle $φ'_i$ may be the same or different.

In some embodiments, a horizontal projection length $l'_3$ of the first arc surface SC1 (or the second arc surface SC2) and a vertical projection height $h'_3$ of the first arc surface SC1 (or the second arc surface SC2) may both be greater than or equal to 0.5 mm and less than or equal to 20 mm. In addition, the cross-sectional shapes of the first arc surface SC1 and the second arc surface SC2 may include the Bezier curve. For example, the Bezier coefficient of the Bezier curve may be 0.8, the horizontal projection length $l'_3$ may be 10 mm, and the vertical projection height $h'_3$ may be 0.5 mm, but are not limited thereto.

In some embodiments, as shown in FIG. 11, a light receiving area RL' is provided above the light guide plate 10' for receiving the light beam B emitted from the light guide plate 10'. The cross-sectional area of the light receiving area RL' is the same as the cross-sectional area of the light guide plate 10'. In some embodiments, a distance DD' between the light receiving area RL' and the light guide plate 10' is 2.5 mm, but is not limited thereto.

According to a simulation result, as shown in FIG. 12, the full width at half maximum (FWHM) of the divergence angle of the light beam received in the light receiving area RL' (see FIG. 10) is about 25.2 degrees, the light intensity received in the light receiving area RL' is about 63.4% of the light intensity emitted by the light emitting element 12 (see FIG. 11), and the illuminance uniformity in the light receiving area RL' is about 80.5%.

In the embodiment, the light source module 1' is an edge type light source module. The light emitting element 12 is disposed on the side (e.g., the first side SS1) of the light guide plate 10', and is disposed adjacent to the center X100 and the center X102. The light beam B from the light emitting element 12 is guided into the light guide plate 10' by the reflective curved surfaces (e.g., the first arc surface SC1 and the first reflective layer 14'; the second arc surface SC2 and the second reflective layer 18'). With the design of the lens microstructures S100 and the V-groove microstructures S102, the light beam B transmitted in the light guide plate 10' is enabled to be emitted from the upper surface of the light guide plate 10' with a small divergence angle. The directivity and/or uniformity of light emitted by the light source module 1' may be improved by utilizing the above design, and the light source module 1' may be applied to electronic devices that have special requirements for directivity and/or uniformity of light. For example, the light source module 1' may be used as a backlight module of the floating imaging device, so as to relax the alignment tolerance between the light shielding layer and the lens array layer, and improve the problem of large-angle stray light. Alternatively, the light source module 1' may be used as a backlight module of the privacy protection electronic device, so that the disposition of the privacy protection sheet may be omitted, and the brightness of the privacy protection electronic device may be improved. Furthermore, the light source module 1' may be used as a backlight module for the in-vehicle display with an upward viewing angle, but is not limited thereto. It should also be mentioned that although not shown, the light source module 1' may include multiple light guide plates 10' and multiple light emitting elements 12, the number of the light guide plates 10' and the number of the light emitting elements 12 are the same, and the relative disposition relationship of the light guide plates 10' and the light emitting elements 12 may be referred to the above, and the description is not repeated here. The light guide plates 10' may be spliced together to form a light source module of larger size, as shown in FIG. 13. Since the light guide plate 10' helps to improve the uniformity of the light emitted by the light source module 1', the distance between the light emitting elements 12 may be increased under the structure provided with the light guide plate 10', so as to reduce the required number of light emitting elements 12 in an electronic device of the same size, thereby reducing the process cost.

In summary, in the embodiments of the disclosure, the design of the upper surface concentric circle structure and the lower surface concentric circle structure enables the light beam transmitted in the light guide plate to be emitted from the upper surface of the light guide plate with a small divergence angle, thereby improving the directivity and/or uniformity of the light emitted by the light source module.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A light source module, comprising:
a light guide plate, comprising an upper surface concentric circle structure and a lower surface concentric circle structure opposite to the upper surface concentric circle structure, wherein a center of the upper surface concentric circle structure corresponds to a center of the lower surface concentric circle structure; and
a light emitting element, disposed corresponding to the center of the upper surface concentric circle structure and the center of the lower surface concentric circle structure,
wherein the upper surface concentric circle structure comprises a plurality of lens microstructures arranged in concentric circles, the lower surface concentric circle structure comprises a plurality of V-groove microstructures arranged in concentric circles, the plurality of lens microstructures and the plurality of the V-groove microstructures are disposed in a one-to-one relationship, and each of the plurality of V-groove microstructures is disposed adjacent to a focal point of a corresponding lens microstructure,
wherein an arc opening angle of each of the plurality lens microstructures is greater than or equal to 1 degree and less than or equal to 30 degrees, and
wherein each of the plurality of V-groove microstructures has a first inclined surface and a second inclined surface, the first inclined surface is located between the center of the lower surface concentric circle structure and the second inclined surface, a first angle is provided between the first inclined surface and a vertical line, a second angle is provided between the second inclined surface and the vertical line, and the first angle and the second angle are both greater than or equal to 10 degrees and less than or equal to 40 degrees.

2. The light source module according to claim 1, wherein the focal point of each of the plurality of lens microstructures falls within a width range of the corresponding V-groove microstructure.

3. The light source module according to claim 1, wherein radii of curvature and widths of the plurality of lens microstructures are fixed, and heights and widths of the plurality of V-groove microstructures gradually increase in a direction away from the center of the lower surface concentric circle structure.

4. The light source module according to claim 1, wherein the radii of curvature and the widths of the plurality of the lens microstructures gradually increase or gradually decrease in the direction away from the center of the upper surface concentric circle structure, and the heights and the widths of the plurality of the V-groove microstructures gradually increase in the direction away from the center of the lower surface concentric circle structure.

5. The light source module according to claim 1, wherein the upper surface concentric circle structure further comprises a recess, and the recess is disposed corresponding to the center of the upper surface concentric circle structure,
the lower surface concentric circle structure further comprises a groove, the groove is disposed corresponding to the center of the lower surface concentric circle structure, the light emitting element is disposed in the groove, and the light source module further comprises:
a first reflective layer, disposed on the recess.

6. The light source module according to claim 1, wherein the light guide plate further comprises a first side surface and a second side surface opposite to the first side surface, the center of the upper surface concentric circle structure and the center of the lower surface concentric circle structure are located on the first side surface, and the light emitting element faces the first side surface,
the upper surface concentric circle structure further comprises a first arc surface, and the first arc surface is connected the first side surface and one of the plurality of lens microstructures,
the lower surface concentric circle structure further comprises a second arc surface, the second arc surface is connected to the first side surface and one of the plurality of V-groove microstructures, and the light source module further comprises:
a first reflective layer, disposed on the first arc surface; and
a second reflective layer, disposed on the second arc surface.

7. The light source module according to claim 5, wherein the recess comprises a bottom surface and an arc surface, the arc surface is connected to the bottom surface and one of the plurality of lens microstructures, a diameter of the bottom surface is greater than or equal to 0 mm and less than or equal to 2 mm, and a horizontal projection length of the arc surface and a vertical projection height of the arc surface are both greater than or equal to 0.5 mm and less than or equal to 20 mm.

8. The light source module according to claim 5, wherein the light guide plate further comprises a side surface, and the light source module further comprises:
a reflective layer or a reflective sheet, disposed at the bottom of the light guide plate; and
a second reflective layer, disposed on the side surface of the light guide plate.

9. The light source module according to claim 7, wherein a cross-sectional shape of the arc surface includes a Bezier curve.

10. The light source module according to claim 6, wherein a top view shape of the light guide plate is a concentric segmented circle.

11. The light source module according to claim 6, wherein cross-sectional shapes of the first arc surface and the second arc surface comprise Bezier curves.

12. The light source module according to claim 6, further comprising:
a reflective layer or a reflective sheet, disposed at the bottom of the light guide plate; and
a third reflective layer, disposed on the second side surface of the light guide plate.

* * * * *